United States Patent

[11] 3,585,824

| [72] | Inventor | Peter Schenk |
| | | West Islip, N.Y. |
| [21] | Appl. No. | 809,195 |
| [22] | Filed | Mar. 21, 1969 |
| [45] | Patented | June 22, 1971 |
| [73] | Assignee | Dzus Fastener Co., Inc. |
| | | Islip, N.Y. |

[54] FASTENER ASSEMBLY
10 Claims, 15 Drawing Figs.

[52] U.S. Cl. .................................................... 70/168,
24/221 R, 85/5 P, 70/240, 70/455
[51] Int. Cl. ....................................................... B65d 55/14,
A44b 17/00, E05b 65/12
[50] Field of Search ........................................... 70/167,
168, 169, 172, 237, 240, 258, 259, 455; 24/221,
221.2; 151/41.75; 85/5.2

[56] References Cited
UNITED STATES PATENTS

| 1,790,656 | 2/1931 | Ganz ............................ | 70/259 |
| 1,811,141 | 6/1931 | Leventhal ..................... | 70/455 |
| 2,055,289 | 9/1936 | Hanan .......................... | 70/240 |
| 2,478,972 | 8/1949 | Luce ............................. | 85/5 X |
| 2,756,110 | 7/1956 | Lyon ............................. | 70/259 X |
| 3,415,086 | 12/1968 | Trainor ......................... | 70/240 |
| 3,461,769 | 8/1969 | Brosseit ........................ | 85/1 |

FOREIGN PATENTS

| 581,289 | 10/1946 | Great Britain ................ | 24/221 |
| 495,230 | 6/1954 | Italy ............................. | 85/5 |

*Primary Examiner*—James A. Leppink
*Assistant Examiner*—Edward J. McCarthy
*Attorney*—Kane, Dalsimer, Kane, Sullivan and Kurucz ABSTRACT: A fastener element for joining separate members is provided with spiral cam slots for engaging a spring attached to one of the members. When the fastener element is axially rotated, the spring is urged into the cam slots to fasten the spring and element together. The fastener element is provided with locking means to prevent axial rotation. Means are also provided, either in combination with the locking means or only with the fastener element, to adjust the length of the fastener element to accommodate the distance between the members to be fastened. This mechanism dispenses, in many instances, with the need to inventory fastening elements of varying lengths.

PATENTED JUN 22 1971  3,585,824

INVENTOR
PETER SCHENK
BY
Kane, Dalimer, Kane, Sullivan & Smith
ATTORNEYS

INVENTOR
PETER SCHENK
BY
Kane, Dalsimer, Kane, Sullivan & Smith
ATTORNEYS

INVENTOR
PETER SCHENK
BY
Kane, Dalsimer, Kane, Sullivan & Smith
ATTORNEYS

INVENTOR
PETER SCHENK
BY
ATTORNEYS

INVENTOR
PETER SCHENK
BY
ATTORNEYS

FASTENER ASSEMBLY

BACKGROUND OF THE INVENTION

This invention relates to a fastener assembly and, more particularly, to an assembly for detachably fastening separate members.

Fastener elements or devices such as those shown in Dzus, U.S. Pat. No. 1,955,740 have been widely used for many years. These fastener elements are easily installed and result in a vibrationproof joint between the fastened members. Since it is frequently necessary to join separate members at varying distances from one another, it is necessary for the manufacturer to supply different size fastener elements having varying shank lengths to accommodate these distances. In addition, it is often desirable to join the separate members and then lock the members in the fastened position to discourage tampering.

BRIEF SUMMARY

A fastener assembly has now been developed which is adjustable and will accommodate varying distances between the members to be joined and/or can be provided with a cooperating mechanism to lock the members in the fastened position.

An object of this invention is to provide a fastener assembly for joining separate members which is provided with means for locking the members in the fastened position.

Another object of this invention is to provide an adjustable fastener assembly to accommodate the distance between the members to be fastened.

Still another object of this invention is to provide a fastener assembly for joining separate members which can be adjusted to the distance between the members and which is provided with means for locking the members in the fastened position.

Other objects and advantages will become apparent from the following description taken in conjunction with the accompanying drawings in which.

In accordance with this invention, a fastener assembly is provided for detachably fastening together separate members. The first of these members is provided with a spring for use in securing the fastener element. The rotatable fastener element includes a hollow shank which is provided with spiral cam slots oppositely disposed in the shank wall to permit engagement of the spring between the slots so that when the shank is axially rotated the spring is urged into the cam slots to fasten the shank and spring together. The fastener element is also provided with means for engaging and holding the second of the members to be joined together in the fastened position.

The fastener assembly can also be provided with releasable means for locking the joined members in the fastened position to prevent reverse rotation of the shank when the spring and cam slots are fastened. This assembly will prevent separation of the members until release of the rotation prevention means.

Another feature which can be included in combination with the fastener element, and also in combination with the locking means if desired, are means for advancing and retracting the fastener element with respect to the holding means to permit adjustment of the length of the fastener assembly to accommodate the distance between the members to be joined. This feature dispenses with the necessity for carrying an inventory of fastening elements having varying shank lengths.

PREFERRED EMBODIMENTS

Figure 2:
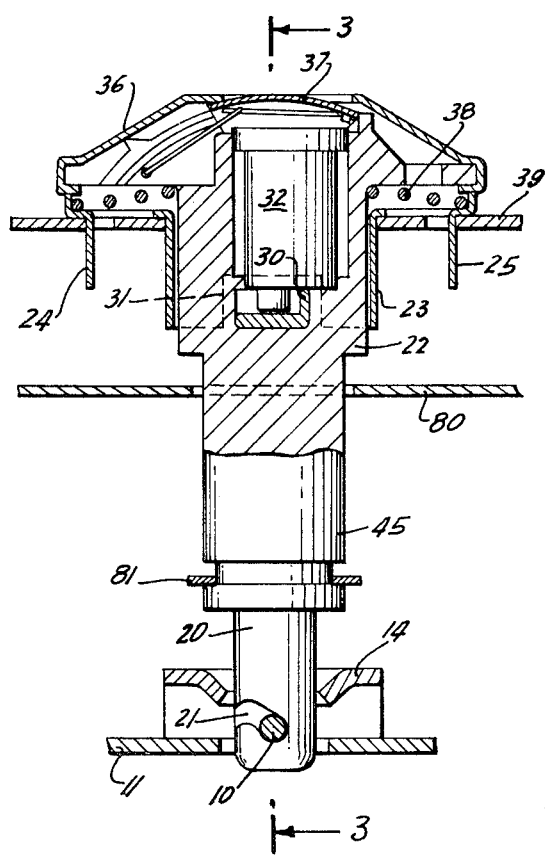
FIG. 2 is a vertical sectional view taken along the line 2-2 of FIG. 1.
Figure 3:
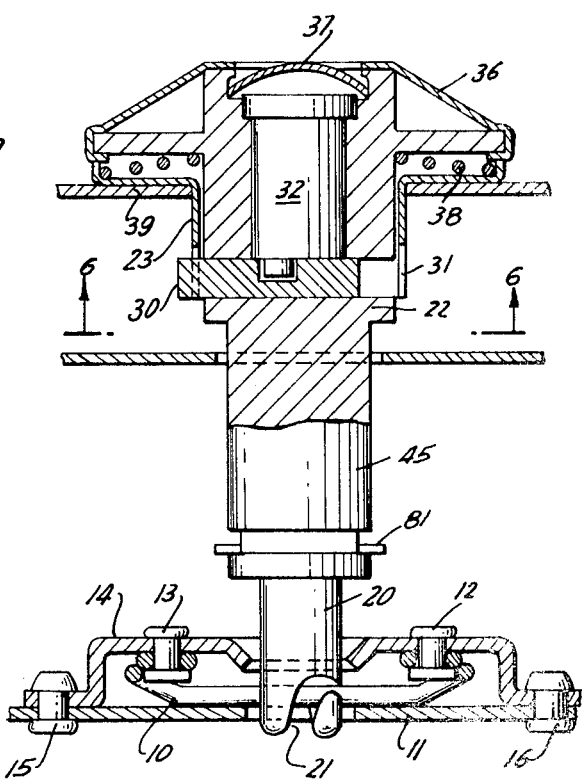
FIG. 3 is a vertical sectional view taken along the line 3-3 of FIG. 2.
Figure 4:
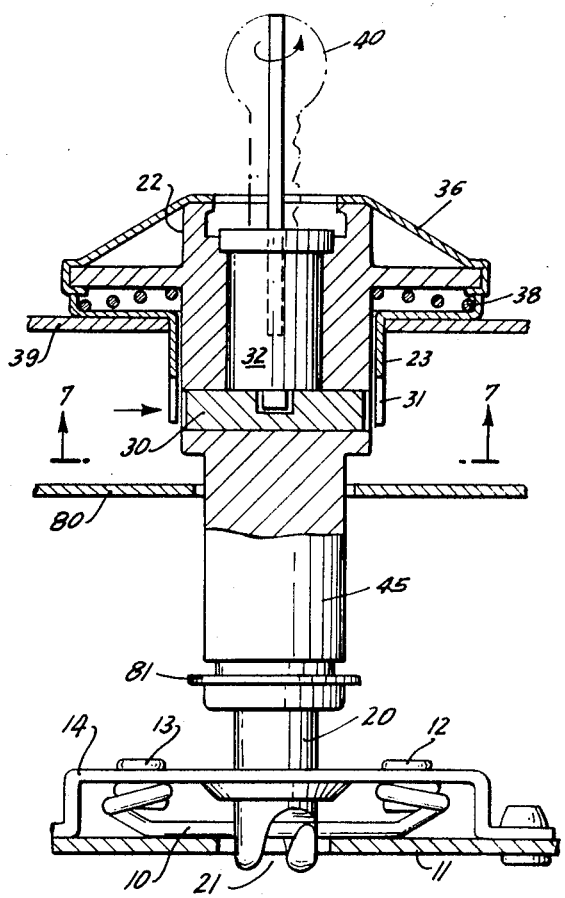
FIG. 4 is a vertical view partly in section showing the fastener assembly and key-operated lock.

Referring now to the drawings, FIGS. 2 and 3 show the fastener assembly joining members 39 and 11. Fastener element 20 is provided with cam slots 21 in engagement with heavy wire spring 10. Sprint 10 is joined by connectors 12 and 13 to bracket 14 which in turn is joined by connectors 15 and 16 to member 11. Housing 22 is rotatably mounted in bracket 23 which engages member 39 and is joined and held thereto by members 24 and 25 which extend through member 39. Lock assembly 32 is rotatably mounted within housing 22 and is provided with retractable bolt 30, which is moved outwardly into aperture 31 in bracket 23. In the outwardly or extended position, bolt 30 is positioned in aperture 31 of independently supported bracket 23 which prevents rotation of housing 22 and fastener element 20 connected thereto. In this locked position, members 39 and 11 are joined in the fastened position. When bolt 30 is withdrawn to the retracted position shown in FIG. 4, housing 22 and fastening element 20 can be rotated to disengage from spring 10 to permit separation of members 39 and 11.

Figure 1:
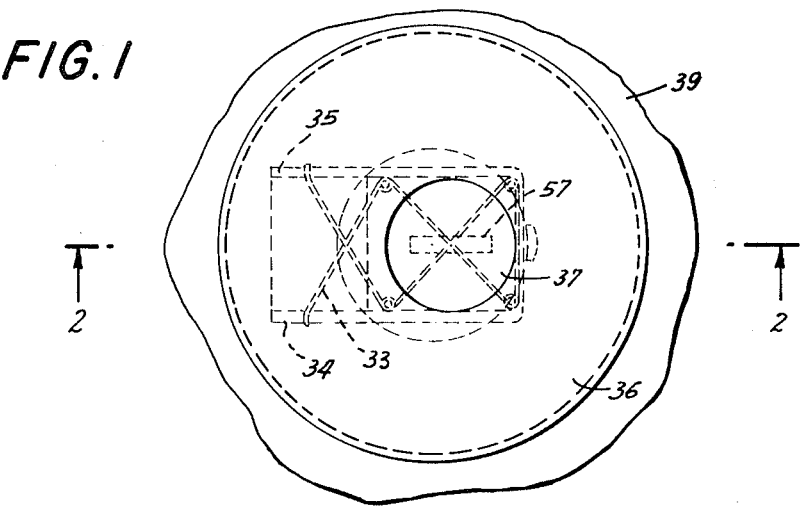
FIG. 1 is a top plan view of the fastener assembly, lock and retractable weatherproof cover.

FIGS. 1 and 2 show a weatherproof covering 37 positioned over lock assembly 32. Cover 37 is movable between a retracted position to permit insertion of a key in opening 57 and an advanced position to protect the lock from moisture, dust and the elements. Cover 37 is movable to the retracted position by means of expansible linkage 33 which rides in tracks 34 and 35 to permit ease of movement between the advanced and retracted positions.

Figure 5:
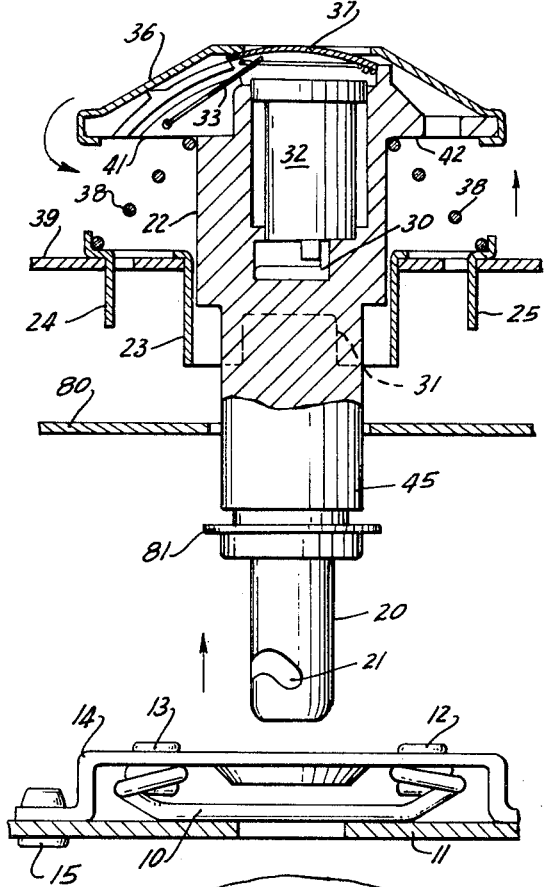
FIG. 5 is a vertical view partly in section showing the fastener assembly and lock partially disassembled.

FIG. 5 shows the lock assembly in the partially uncoupled condition. The fastener assembly and key 40 are rotated in accordance with the arrow shown in FIG. 5 from the position shown in FIG. 4 which disengages spring 10 from slots 21 in fastener element 20. This permits spring 38 to urge housing 22 and shoulders 41 and 42 upwardly to detach member 39 from member 11. Further, upward movement of the fastener assembly is prevented by retaining ring 81 which will engage guide member 80. When spring 10 is positioned in cam slots 21, fastener element is urged upwardly by spring 38 to secure fastener element 20 to spring 10.

Figure 6:
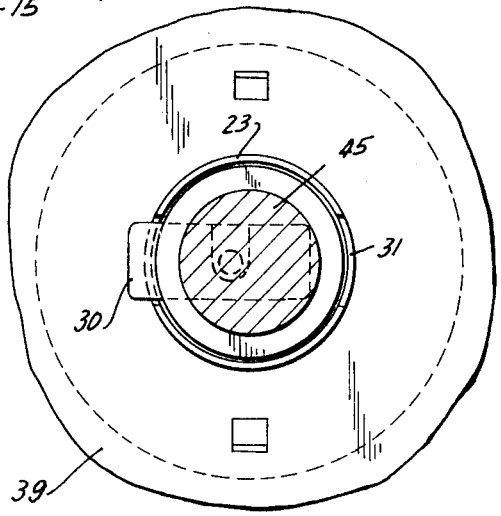
FIG. 6 is a sectional view taken along the line 6-6 of FIG. 3 showing the fastener assembly in the locked position.
Figure 7:
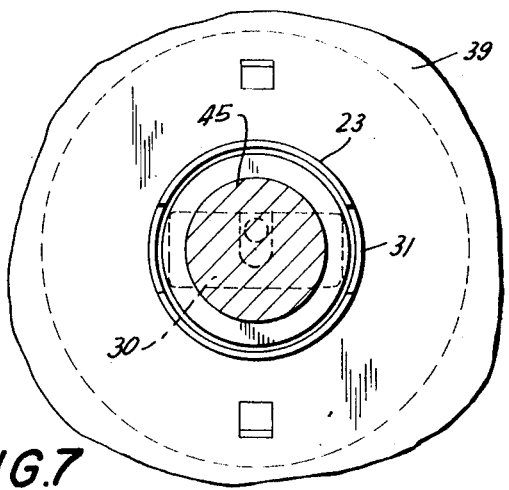
FIG. 7 is a sectional view taken along the line 7-7 of FIG. 4 showing the fastener assembly in the unlocked position.

FIGS. 6 and 7 show the movement of bolt 30 between a locked (advanced) and unlocked (retracted) position. FIG. 6 shows bolt 30 extended into aperture 31 of bracket 23 to prevent rotation of housing 22 and fastener element 20. FIG. 7 shows bolt 30 in the retracted or open position which will allow rotational movement of housing 22 and fastener element 20 to permit separation of members 39 and 11.

Figure 8:
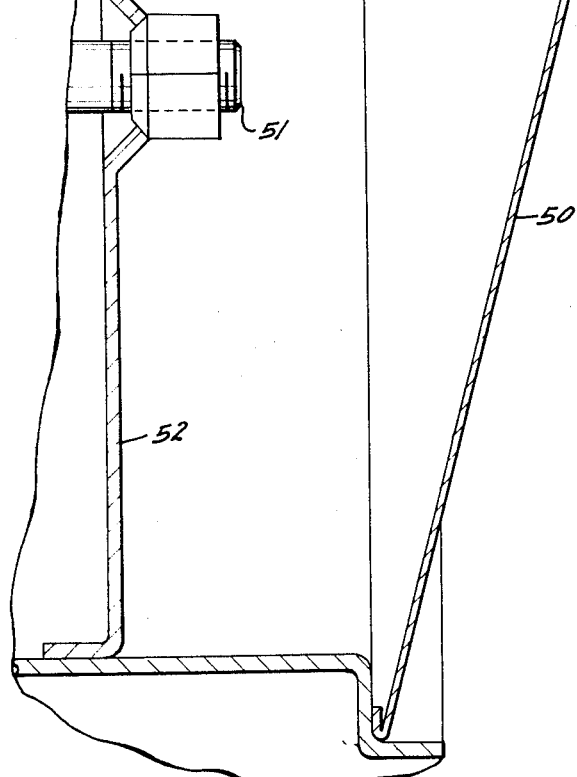
FIG. 8 is a vertical sectional view of the fastener assembly in the locked position joining a wheel cover to the wheel of an automobile to prevent unauthorized removal of the wheel cover.
Figure 9:
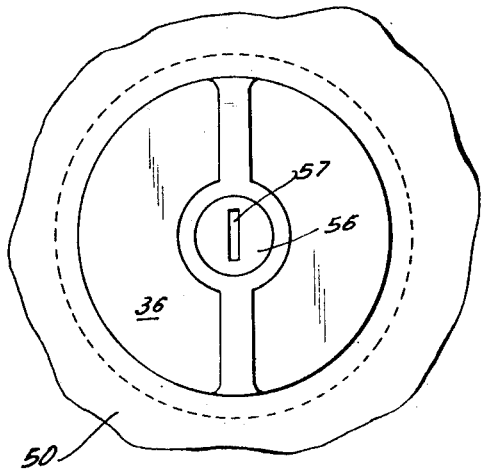
FIG. 9 is a front elevation view of the fastener assembly, lock and wheel cover.
Figure 10:
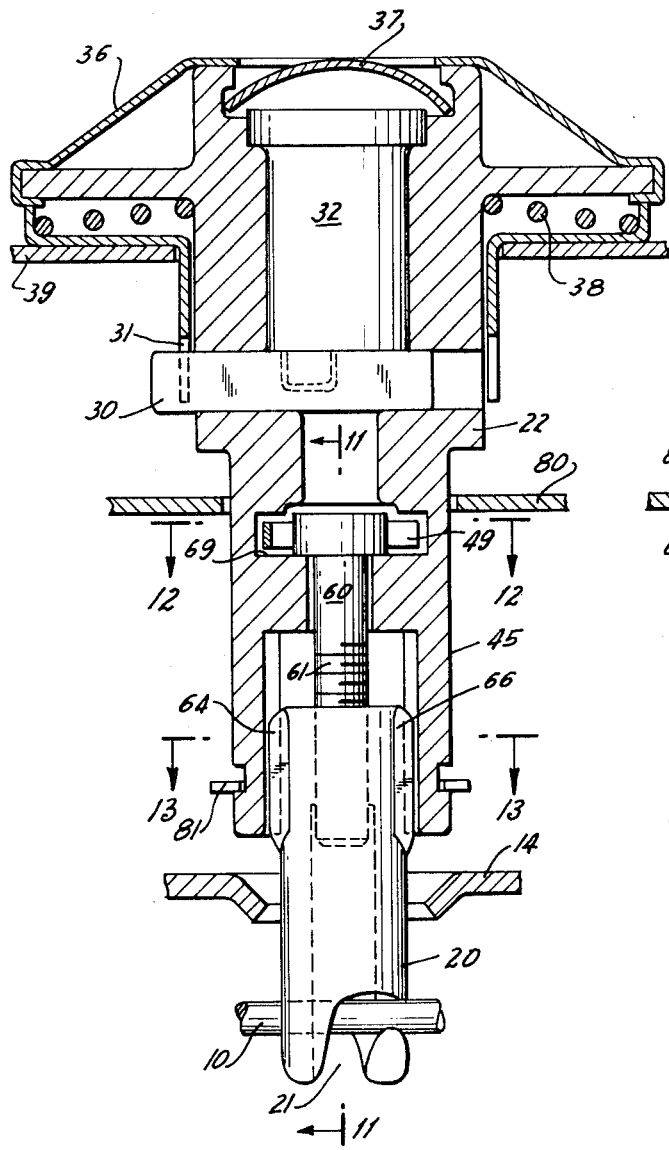
FIG. 10 is a vertical view partly in section showing the fastener element and lock in combination with an adjusting mechanism to accommodate the distance between the joined members.
Figure 11:
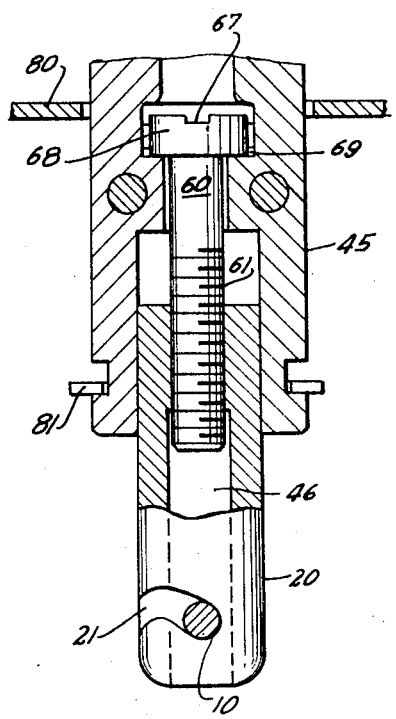
FIG. 11 is a vertical sectional view of the adjustable mechanism taken along the line 11-11 of FIG. 10.

FIG. 8 is an embodiment of this invention which shows the fastener assembly joining hub cap or wheel cover 50 to rigidly connected internal member 53 positioned adjacent lug 51 of automobile wheel 52 through spring 55. Here, fastener element 54 is provided with slots 59 which engage spring 55 to couple fastener element 54 and member 53 in the fastened position. The fastener assembly is positioned on spring 55 and rotated by means of handle 58. Fastener element 54 can then be prevented from rotation in the opposite direction by means of lock 56 operating in the same manner as that depicted in FIGS. 2 to 7. FIG. 9 is a front elevation showing opening 57 in lock 56 to permit insertion of a key.

Figure 12:
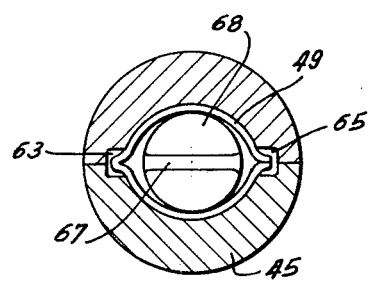
FIG. 12 is a horizontal sectional view taken along the line 12-12 of FIG. 10.
Figure 13:
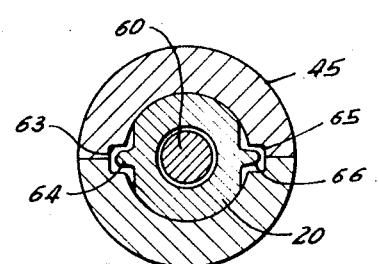
FIG. 13 is a horizontal sectional view taken along the line 13-13 of FIG. 10.

Another embodiment of this invention is shown in FIGS. 10 to 14. In this embodiment, fastener element 20 is provided with hollow section 46 and internal thread 62. Threaded member or screw 60 having mating thread 61 engages internal thread 62 of fastener element 20. Screwhead 68 is surrounded by friction clip 49 for spacing and securing the head on shoulder 69 of housing 22 and can be rotated by means of a screwdriver inserted into kerf 67. Sleeve 45 extends downwardly from housing 22 and as shown in FIGS. 12 and 13 is provided with internal recesses 63 and 65 for receiving outwardly extending projections 64 and 66, respectively, of fastener element 20. As screw 60 is rotated, fastener element 20 is prevented from rotating by projections 64 and 66. Since fastener element 20 cannot rotate along with screw 60, it is forced to ride upwardly or downwardly in sleeve 45 (depending upon the direction of rotation of screw 60) between retracted and advanced positions. Thus, the length of the fastener assembly can be altered, and the tension between the fastener element and spring varied, by moving fastener element 20 between the advanced and retracted position. By moving between these positions, the varying distances between members to be fastened can be accommodated. As can be seen from FIG. 10, the means for moving fastener element 20 between advanced and retracted positions can be incorporated into the fastener assembly in combination with lock assembly 32 so that the fastener assembly not only can be adjusted as to length to accommodate the distance between the members to be joined, but can also lock these members in the fastened position. Adjusting the length of the fastener assembly also adjusts the tension of spring 10 in slots 21 which facilitates locking by making reverse axial rotation of fastener element 20 more difficult.

Figure 14:
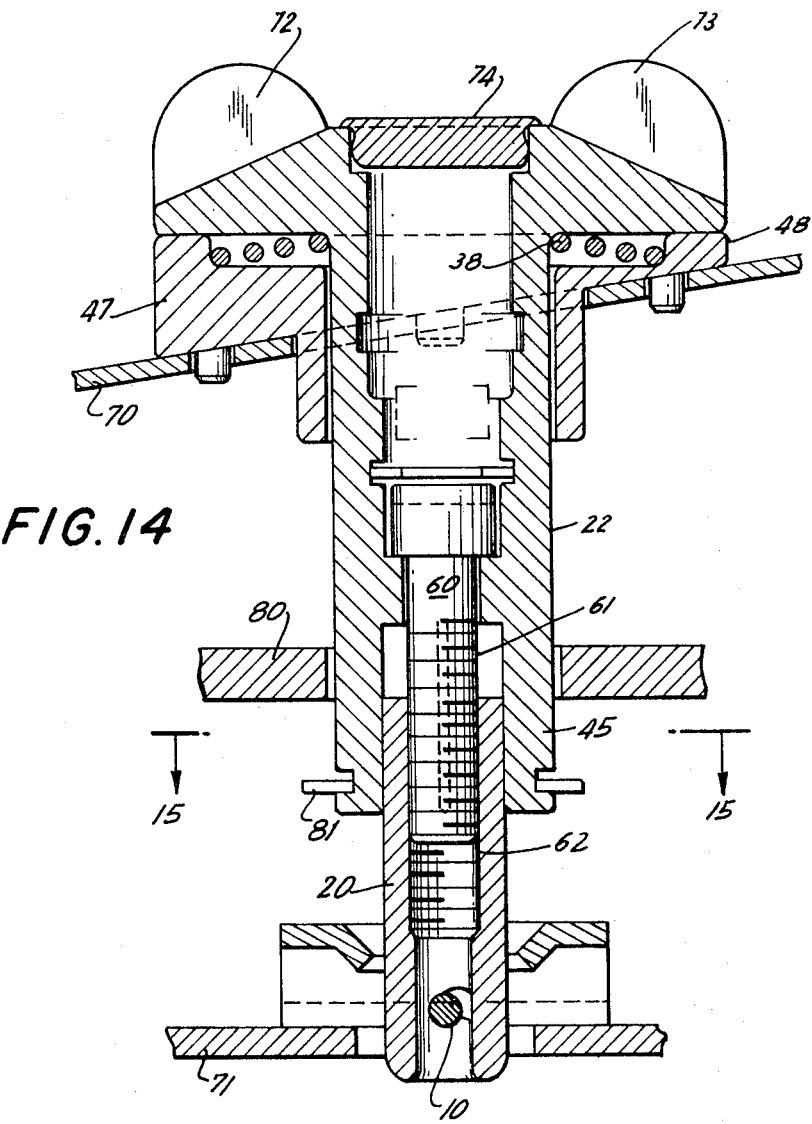
FIG. 14 is a partial sectional view of the fastener assembly and adjustable mechanism joining the hood of an automobile with an internally positioned member.
Figure 15:
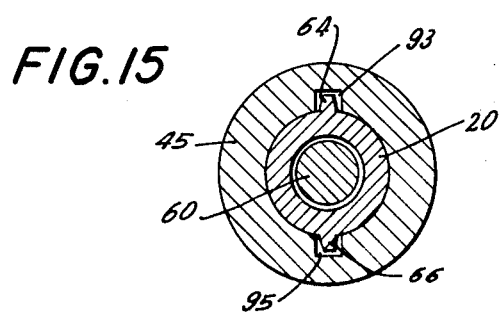
FIG. 15 is a horizontal sectional view taken along the line 15-15 of FIG. 14.

FIG. 14 shows the fastener assembly provided with screw 60 positioned within fastener element 20. The fastener element is shown engaging automobile hood 70 (shown only partly in section) joined to rigidly supported internal member 71. As can be seen from FIG. 14, automobile hood 70 slopes downwardly and by using shoulders 47 and 48 to engage hood 70, the fastener assembly can be adjusted or levelled to accommodate most any surface. When used in conjunction with an automobile hood, the fastener assembly can be locked to prevent unauthorized tampering with the hood.

Although the present invention has been described in conjunction with preferred embodiments, it is to be understood that modifications and variations may be resorted to without departing from the spirit and scope of the invention as those skilled in the art will readily understand.

I claim:

1. In a fastener assembly for detachably fastening together separate members wherein a spring is secured to the first of said members, the improvement in combination therewith which comprises:

a rotatable fastener element having an exposed enlarged grasping means on one side of said second member and which includes a shank extending from said grasping means and through said second member and being provided with a spiral cam slot disposed in the shank wall distal from said second member and proximal to said spring to permit engagement of the spring in the slot so that when the grasping means and the shank are axially rotated the spring is urged into the cam slot to fasten the shank and spring together;

means carried by the fastener element for engaging and holding the second of said members in the fastened position; and releaseable means rotatably carried by the fastener element for preventing reverse rotation of the shank when the spring and cam slot are in the fastened position; thereby preventing separation of said members until release of the rotation prevention means.

2. A fastener assembly in accordance with claim 1 wherein the releaseable means for preventing reverse rotation of the fastener element include a key-actuated lock assembly which comprises:

a bolt movable under the action of the key between a retracted and advanced position; and an independently supported bracket provided with an aperture for receiving the bolt in the advanced position to prevent relative rotation between the fastener element and bracket.

3. A fastener assembly in accordance with claim 2 including means for advancing and retracting the fastener element relative to the holding means to permit adjustment of the length of the fastener assembly to accommodate the distance between the first and second members.

4. A fastener assembly in accordance with claim 3 wherein the fastener element is provided with an internally threaded section and the means for advancing and retracting the fastener element comprise:

a threaded member for engaging the shank thread;

means for preventing relative rotation between the fastener element and the threaded member so that when the threaded member rotatably engages the shank thread the fastener element will be prevented from rotating relative to the threaded member and will ride on the threaded member to alter the length of the fastener assembly.

5. A fastener assembly in accordance with claim 2 including a weatherproof cover positioned over the lock assembly movable between a retracted position to permit key insertion and an advanced position to protect the lock from dust, moisture and the elements.

6. In a fastener assembly for detachably fastening together separate members wherein a spring is secured to the first of said members, the improvement in combination therewith which comprises:

a rotatable fastener element having an exposed enlarged grasping means on one side of said second member and which includes a shank extending from said grasping means and through said second member and being provided with a spiral cam slot disposed in the shank wall distal from said second member and proximal to said spring to permit engagement of the spring in the slot so that when the grasping means and shank are axially rotated the spring is urged into the cam slot to fasten the shank and spring together;

means carried by the fastener element for engaging and holding the second of said members in the fastened position; and means for advancing and retracting the fastener element relative to the holding means to permit adjustment of the length of the fastener assembly to accommodate the distance between the first and second members.

7. A fastener assembly in accordance with claim 6 wherein the shank is provided with a threaded section and the advancing and retracting means comprise:

a threaded member for engaging the shank thread;

means for preventing relative rotation between the fastener element and the threaded member so that when the threaded member rotatably engages the shank thread the fastener element will be prevented from rotating relative to the threaded member and will ride on the threaded member to alter the length of the fastener assembly.

8. A fastener assembly in accordance with claim 7 wherein the means for advancing and retracting the fastener element are carried by the fastener element and comprise:

a projection extending outwardly from the fastener element; and a sleeve surrounding the fastener element and provided with an internal recess for receiving the shank projection to thereby prevent relative rotation between the fastener element and shank.

9. A fastener assembly in accordance with claim 8 wherein the means for engaging and holding the second member in the fastened position comprise:

a housing in supporting engagement with the threaded member; and shoulders laterally extending from the housing for engaging the second member.

10. A fastener assembly in accordance with claim 8 including a lock assembly carried by the fastener element and rotatable therewith.